(12) United States Patent
Hecht et al.

(10) Patent No.: US 7,753,628 B2
(45) Date of Patent: Jul. 13, 2010

(54) CUTTING TOOL

(75) Inventors: Gil Hecht, Nahariya (IL); Oleg Eliezer, Nahariya (IL); Tsur Cohen, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 867 days.

(21) Appl. No.: 11/616,377

(22) Filed: Dec. 27, 2006

(65) Prior Publication Data

US 2007/0196188 A1    Aug. 23, 2007

(30) Foreign Application Priority Data

Feb. 22, 2006    (IL) .................................. 173877

(51) Int. Cl.
*B23B 31/11* (2006.01)
(52) U.S. Cl. ................... 408/233; 408/239 R; 408/1 R; 409/234; 279/8; 279/99
(58) Field of Classification Search ................. 408/238, 408/239 R, 239 A, 231, 232, 233, 1 R; 409/232, 409/234; 279/8, 99–101
See application file for complete search history.

(56) References Cited

U.S. PATENT DOCUMENTS

| 1,407,335 | A |   | 2/1922  | Reynolds |           |
|-----------|---|---|---------|----------|-----------|
| 4,557,642 | A | * | 12/1985 | Dudas et al. | 408/239 R |
| 4,850,759 | A | * | 7/1989  | Strand et al. | 408/239 A |
| 5,899,642 | A |   | 5/1999  | Berglow et al. |         |
| 6,394,711 | B1 |  | 5/2002  | Brosius  |           |
| 6,503,027 | B2 |  | 1/2003  | Men      |           |
| 6,565,291 | B2 |  | 5/2003  | Harpaz et al. |       |
| 7,101,128 | B2 | * | 9/2006 | Hansson  | 409/234   |
| 7,407,351 | B2 | * | 8/2008 | Pantzar et al. | 409/234 |
| 7,513,724 | B2 | * | 4/2009 | Kakai    | 409/234   |
| 2002/0006315 | A1 | | 1/2002 | Harpaz  |           |

FOREIGN PATENT DOCUMENTS

| CH | 583 084         |   | 12/1976 |
|----|-----------------|---|---------|
| DE | 3711412 A1      | * | 10/1988 |
| EP | 0 015 248       |   | 12/1993 |
| EP | 0 776 719       |   | 5/2002  |
| JP | 05-318208       |   | 12/1993 |
| JP | 2003200311 A    | * | 7/2003  |
| JP | 2003231007 A    | * | 8/2003  |
| WO | WO 02076661 A1  | * | 10/2002 |

OTHER PUBLICATIONS

Int'l Search Report in PCT/IL2007/000107.

* cited by examiner

*Primary Examiner*—Daniel W Howell
(74) *Attorney, Agent, or Firm*—Womble Carlyle

(57) ABSTRACT

A cutting tool has a cutting head which is removably secured to an adaptor of a tool holder. Upon replacement of the cutting head the adaptor remains fixed in the tool holder. In addition to the adaptor, the cutting tool includes a shank in which the adaptor may be retained, and a retaining element configured to form a sub-assembly with the adaptor without being threadingly engaged thereto. The retaining element is positioned and configured to limit rotation of the adaptor about a longitudinal axis of the tool.

20 Claims, 10 Drawing Sheets

CUTTING TOOL

FIELD OF THE INVENTION

The present invention relates to a cutting tool having an interchangeable cutting head.

BACKGROUND OF THE INVENTION

In such cutting tools, low repeatability in the location of the cutting head may affect cutting accuracy. In addition, cutting forces acting on the cutting head during a cutting operation may displace the cutting head.

U.S. Pat. No. 6,565,291, in its FIG. 3, discloses a cutting tool assembly including a tool shank having an elongated hole, a support bar that can be inserted into the elongated hole, a coupling bar configured to be secured within the elongated hole and a cutting head which is releaseably mounted to the support bar. The rear end of the support bar and the front end of the coupling bar are threadingly engaged to one another. While the support bar is inserted through a forward end of the tool shank, the coupling bar is inserted through the rear end, both bars requiring both internal and external threads of various diameters. This may be less than optimal for repeatable positioning of the cutting head.

SUMMARY OF THE INVENTION

In one aspect, the present invention is directed to a tool holder having a longitudinal axis A and comprising: a shank having a shank cavity that extends along the longitudinal axis A, the shank cavity comprising a retaining wall provided with at least one retaining thread; an adaptor extending along the longitudinal axis A and having an external thread engaged to said at least one retaining thread; and a retaining element extending along the longitudinal axis A and being fixed in the shank cavity, wherein a forward portion of the retaining element and a rear portion of the adaptor overlap in a direction transverse to the longitudinal tool axis A without being threadingly engaged to one another.

The forward portion of the retaining element may be positioned and configured to limit rotation of the adaptor about the longitudinal axis A.

The retaining element may be threadingly engaged in the shank cavity.

A peripheral surface of the retaining element may be provided with an external thread which also is threadingly engaged to said at least one retaining thread.

The adaptor and the retaining element may both be threadingly engaged to a single continuous retaining thread formed on the retaining wall of the shank cavity.

The rear portion of the adaptor may be provided with a bore having a bore axis that is transverse to the longitudinal axis; the forward portion of the retaining element may be provided with a hook which is positioned in the bore; and the hook and bore are shaped so as to prevent full separation of the retaining element from the adaptor along a solely axial direction.

The forward portion of the retaining element may be located between portions of the adaptor.

In another aspect, the present invention is directed to a cutting tool having a longitudinal tool axis A defining a forward to rear direction, the cutting tool comprising the aforementioned tool holder and a cutting head removably secured to the adaptor.

The adaptor further has a first thread, the cutting head comprises a cutting portion and a fastening portion, the fastening portion having a threaded portion; and the threaded portion of the cutting head is threadingly engaged to the first thread of the adaptor, thereby removably securing the cutting head to the adaptor.

The first thread of the adaptor may be an internal thread while the threaded portion of the cutting head comprises an external thread.

The fastening portion of the cutting head may be integrally formed with the cutting portion to have unitary one-piece construction.

In still another aspect, the present invention is directed to an inventive cutting tool having a longitudinal tool axis A and comprising a tool holder. The tool holder itself comprises a shank, an adaptor and a retaining element all arranged along the tool longitudinal axis A, wherein the shank comprises an axially extending shank cavity; the adaptor is threadingly engaged in the shank cavity; and a forward portion of the retaining element and a rear portion of the adaptor overlap in a direction transverse to the longitudinal tool axis A without being threadingly engaged to one another, said forward portion of the retaining element being positioned and configured to limit rotation of the adaptor about the longitudinal tool axis A. In this inventive cutting tool, a cutting head is retained by the adaptor.

Axial support of the adaptor within the shank cavity may be provided solely by threaded engagement of an external thread formed on the adaptor with a retaining thread formed in the shank cavity.

In yet another aspect, the present invention is directed to a method of assembling a cutting tool. The inventive method comprises: providing a cutting head; providing a shank having a shank cavity extending along a first longitudinal axis and defining a forward end and a rear end; providing an adaptor having an adaptor cavity extending along a second longitudinal axis, the adaptor having a bore formed at a rear end thereof, the bore generally extending along a bore axis which is transverse to said second longitudinal axis; providing a retaining element having a third longitudinal axis, the retaining element having a forward end provided with a hook, the hook generally extending along a hook axis which is transverse to said third longitudinal axis; aligning the hook axis of the retaining element with the bore axis of the adaptor; urging at least one of the retaining element and the adaptor towards the other until at least a portion of the hook is located in the bore and the retaining element and the adaptor form a sub-assembly; inserting the sub-assembly into the shank cavity such that the adaptor and the retaining element both threadingly engage the shank cavity; and threadingly engaging the cutting head to the adaptor.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
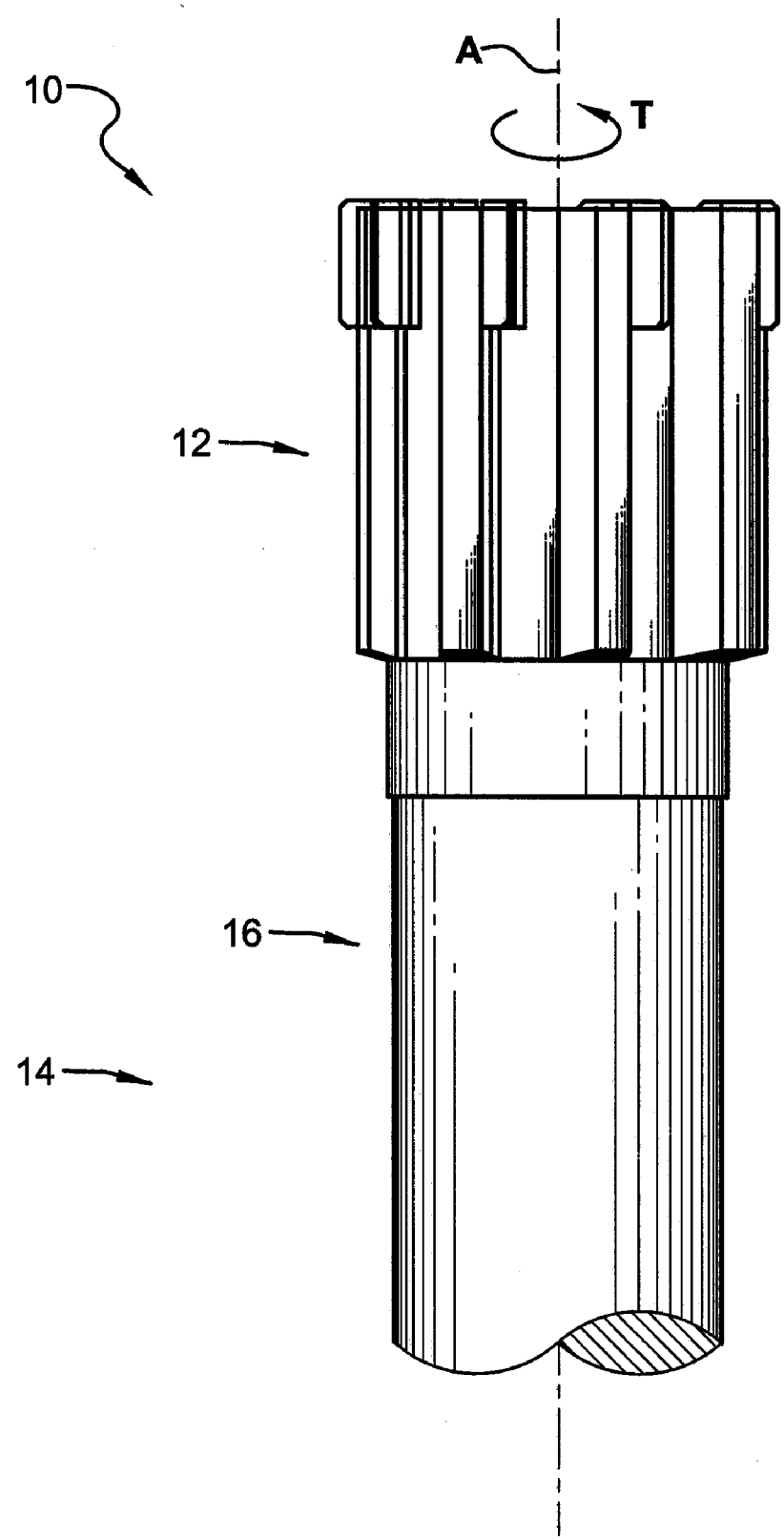
FIG. 1 is a side view of a reamer in accordance with the present invention.
Figure 2:
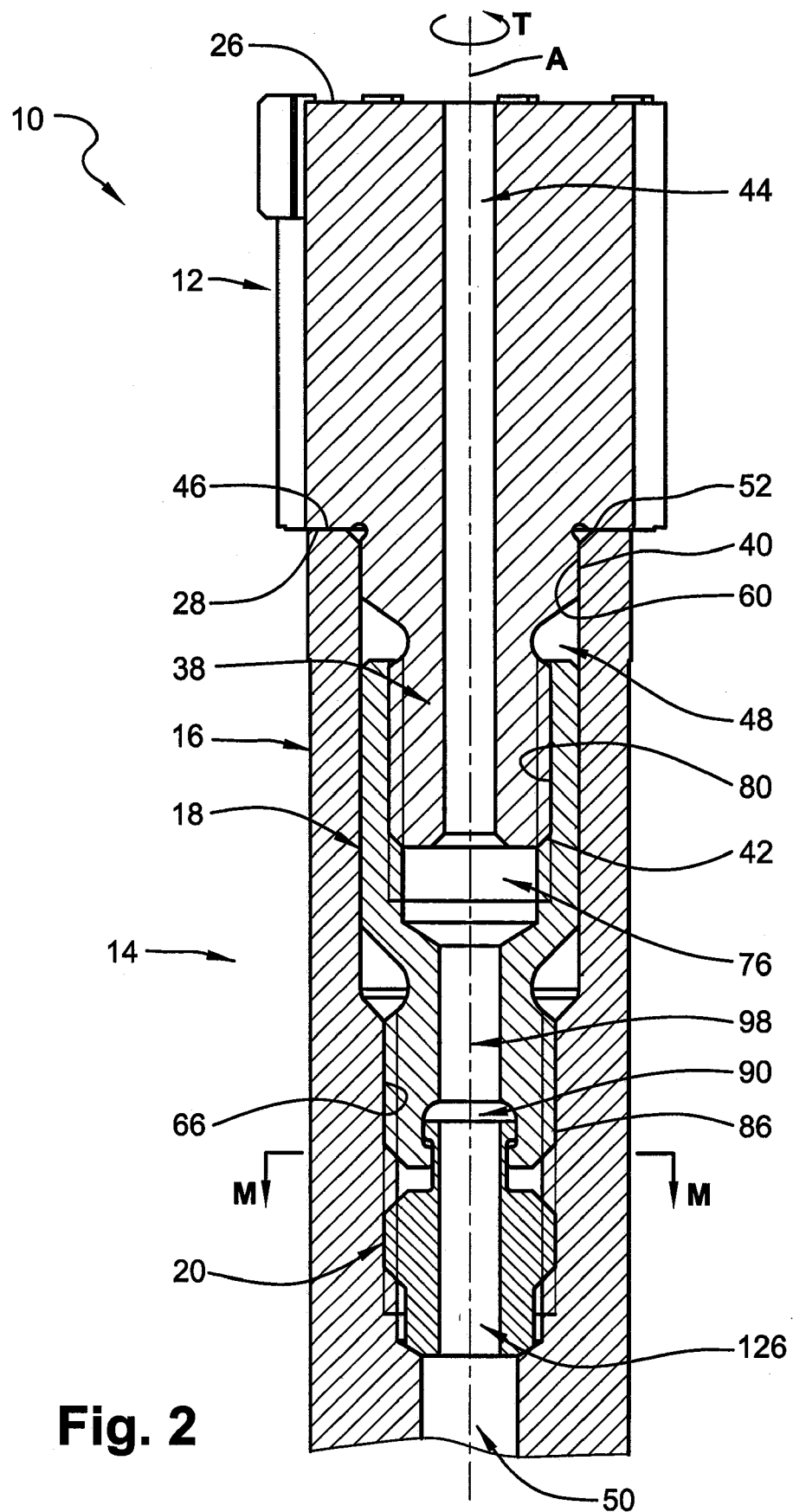
FIG. 2 is a longitudinal cross sectional view of the reamer, taken in the plane of FIG. 1.

Attention is first drawn to FIGS. 1 and 2 showing a reamer 10 having a longitudinal tool axis A defining an axial forward to rear direction and a tangential direction T thereabout. The reamer 10 has a forward cutting head 12 and a rear tool holder 14 which includes a shank 16, an adaptor 18 and a retaining element 20 which are all located about the tool axis A when the reamer 10 is assembled. The cutting head 12 may be a form pressed and sintered hard metal body made from a carbide powder such as Tungsten Carbide; or like the shank 16, the adaptor 18 and the retaining element 20 of the tool holder 14 may be formed of machined steel or other hard materials.

The present invention will be described herein with reference to the reamer 10. However, it will be clear to the skilled person in the art that it may be applied to a variety of rotary or non-rotary cutting tools where releasable mounting of the cutting head 12 is required. In the case of a rotary cutting tool, such as the reamer, the longitudinal tool axis A may also be referred to as a longitudinal tool axis of rotation having a direction of rotation which is similar to the tangential direction T.

Each part of the reamer 10 will be described herein in its respective orientation in the assembled reamer 10 and therefore in relation to the tool axis A and to the forward, rear and tangential T directions. It should be noted that directional terms appearing throughout the specification and claims, e.g. "forward", "rear", "tangential" etc., (and derivatives thereof) are for illustrative purposes only, and are not intended to limit the scope of the appended claims.

Figure 3:
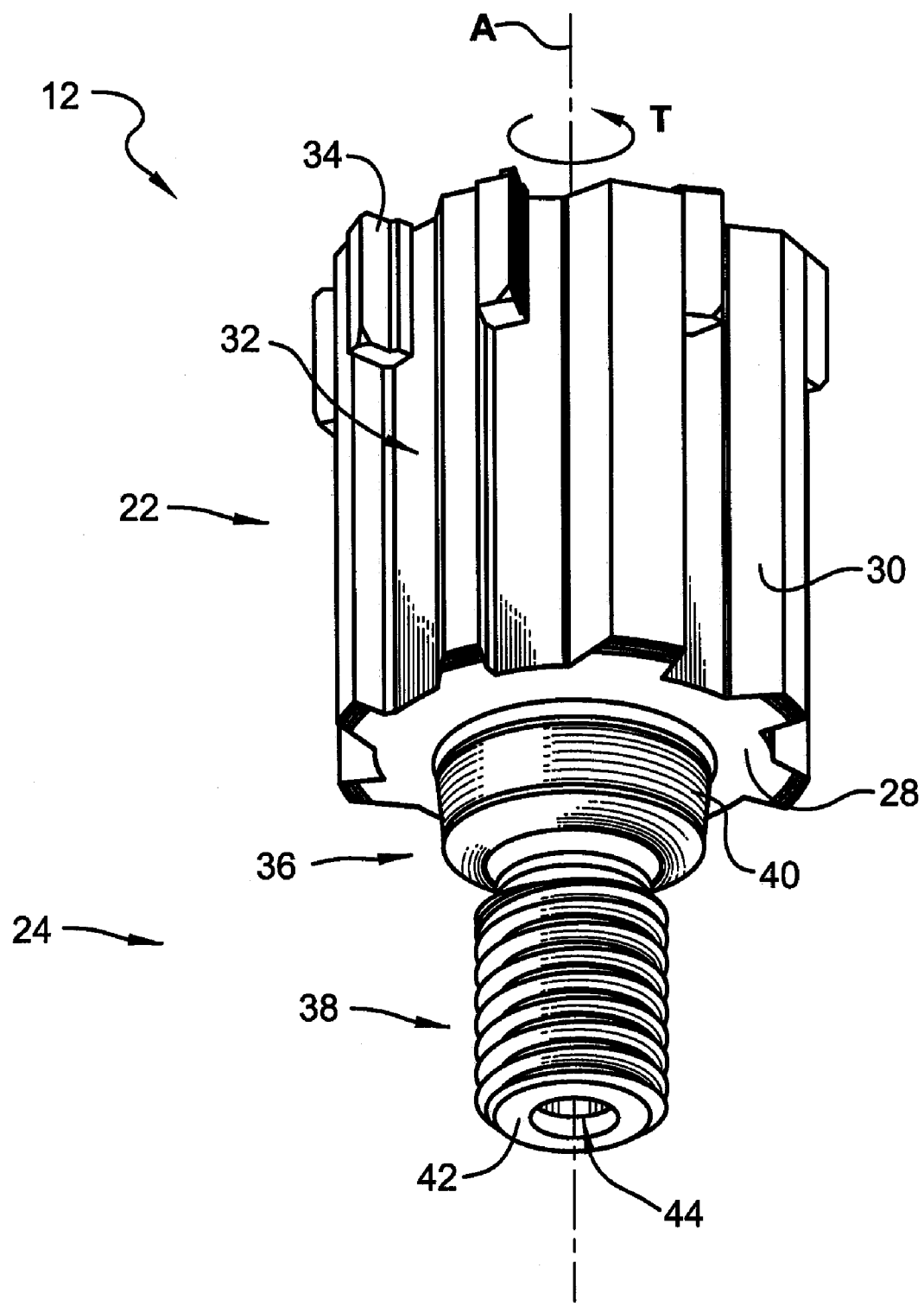
FIG. 3 is a perspective bottom view of a cutting head.

Attention is now additionally drawn to FIG. 3. The cutting head 12 extends along the tool axis A and has a cutting portion 22 and a fastening portion 24. In one embodiment, the cutting head's fastening portion 24 is integrally formed with the cutting portion 22 to have unitary one-piece construction. The cutting portion 22 has a forwardly facing head face 26 at a forward end (best seen in FIG. 2), a rearwardly facing head annular face 28 at a rear end and an axially extending peripheral head surface 30 therebetween. A plurality of flutes 32, symmetrically distributed about the tool axis A, extend axially along the peripheral head surface 30 and open out to a forward end and a rear end of the cutting portion 22. Each flute 32 has a cutting insert 34 at a forward end thereof which is brazed thereto. Each cutting inserts 34 may also be removably secured to a respective flute 32 by for example a screw or integrally formed therewith.

The fastening portion 24 has a support portion 36 and a threaded portion 38. The support portion 36 extends rearwardly from the head annular face 28 and has a peripheral head support wall 40 which may lie on a peripheral surface of a rearwardly tapering truncated cone or on a peripheral surface of a cylinder. The threaded portion 38 extends rearwardly from a rear end of the support portion 36 to a rearwardly facing circular face 42 thereof which is located at a rear end of the cutting head 12. The threaded portion 38 has an external thread formed on a peripheral surface thereof. The cuffing head 12 has a head channel 44 which extends therethrough along the tool axis A and opens out to the head face 26 and to the circular face 42.

Figure 4:
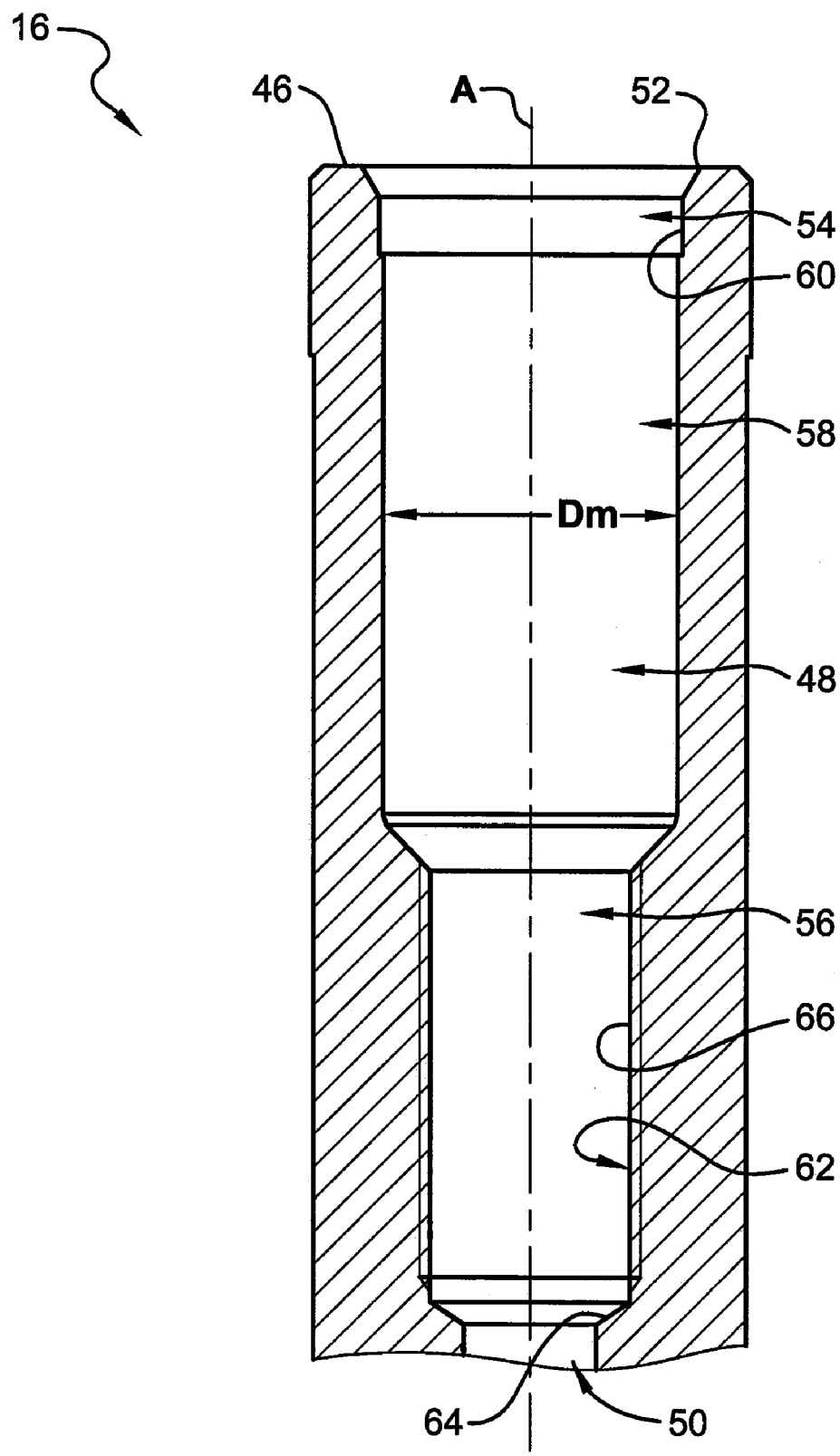
FIG. 4 is a longitudinal cross sectional view of a shank, taken in the plane of FIG. 1.

Attention is now drawn to FIG. 4. The shank 16 has an axially extending cylindrical body which extends along the tool axis A and a forwardly facing shank annular face 46 which is located at a forward end thereof. In addition the shank 16 has a shank cavity 48 and a shank channel 50 which are formed therein. The shank cavity 48 opens out to the shank annular face 46 via an aperture 52 and extends rearwardly therefrom along a first longitudinal axis which in the assembled tool is coincident with the tool axis A. The shank channel 50 extends rearwardly from a rear end of the shank cavity 48 and is coaxial therewith.

The shank cavity 48 has a support section 54, a retaining section 56 and a middle section 58 therebetween. The support section 54 has a peripheral shank support wall 60 which may lie on a peripheral surface of a rearwardly tapering truncated cone or on a peripheral surface of a cylinder. The middle section 58 has an axially extending cylindrical shape having a middle diameter $D_M$. The retaining section 56 has a retaining wall 62 and a stop wall 64. The retaining wall 62 extends rearwardly from a rear end of the middle section 58 and lies of a peripheral surface of a cylinder. A retaining thread 66 is formed on the retaining wall 62. The stop wall 64 extends rearwardly from the retaining wall 62 and lies on a peripheral surface of a rearwardly tapering truncated cone.

Figure 5:
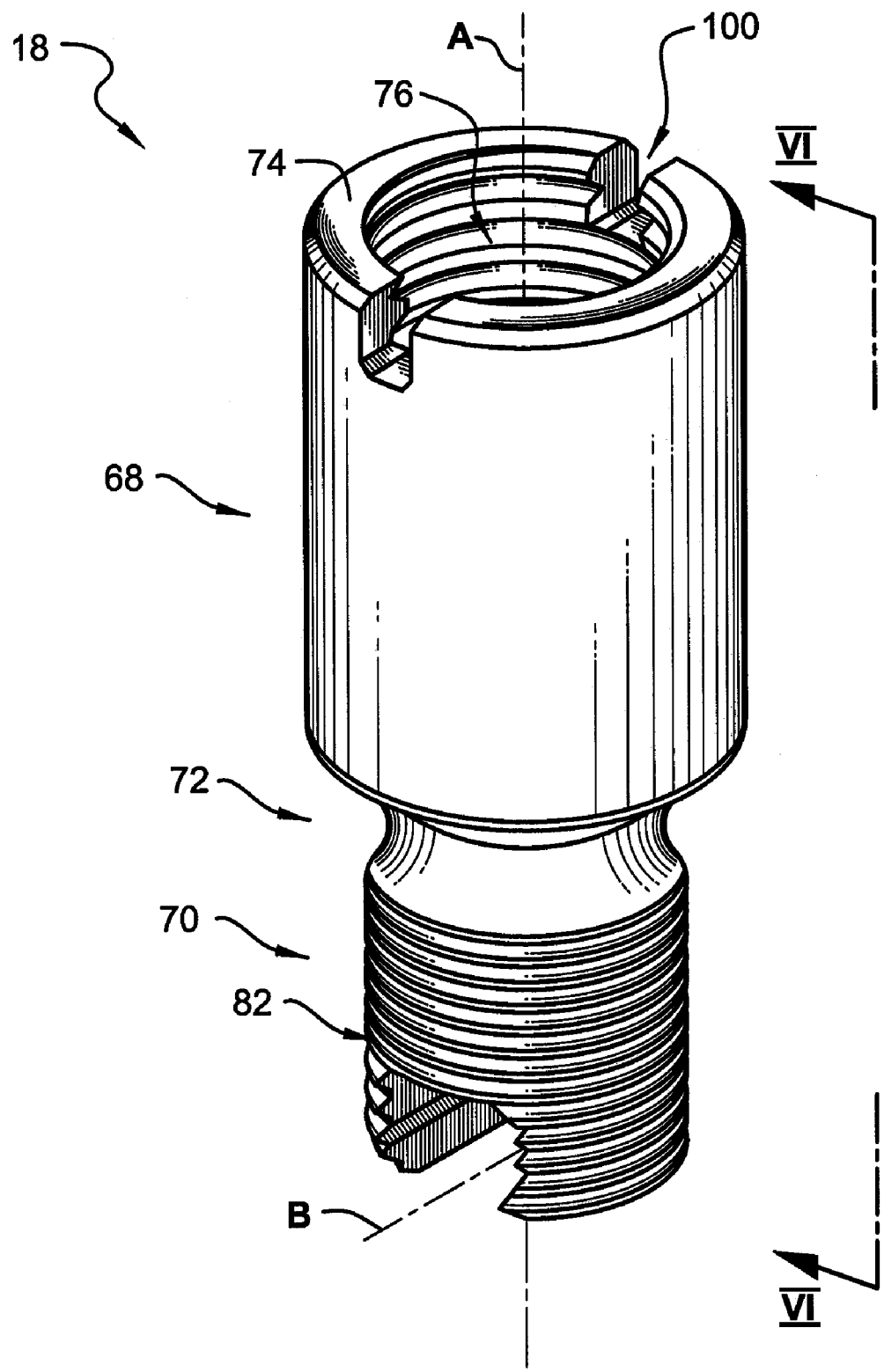
FIG. 5 is a perspective top view of an adaptor.
Figure 6:
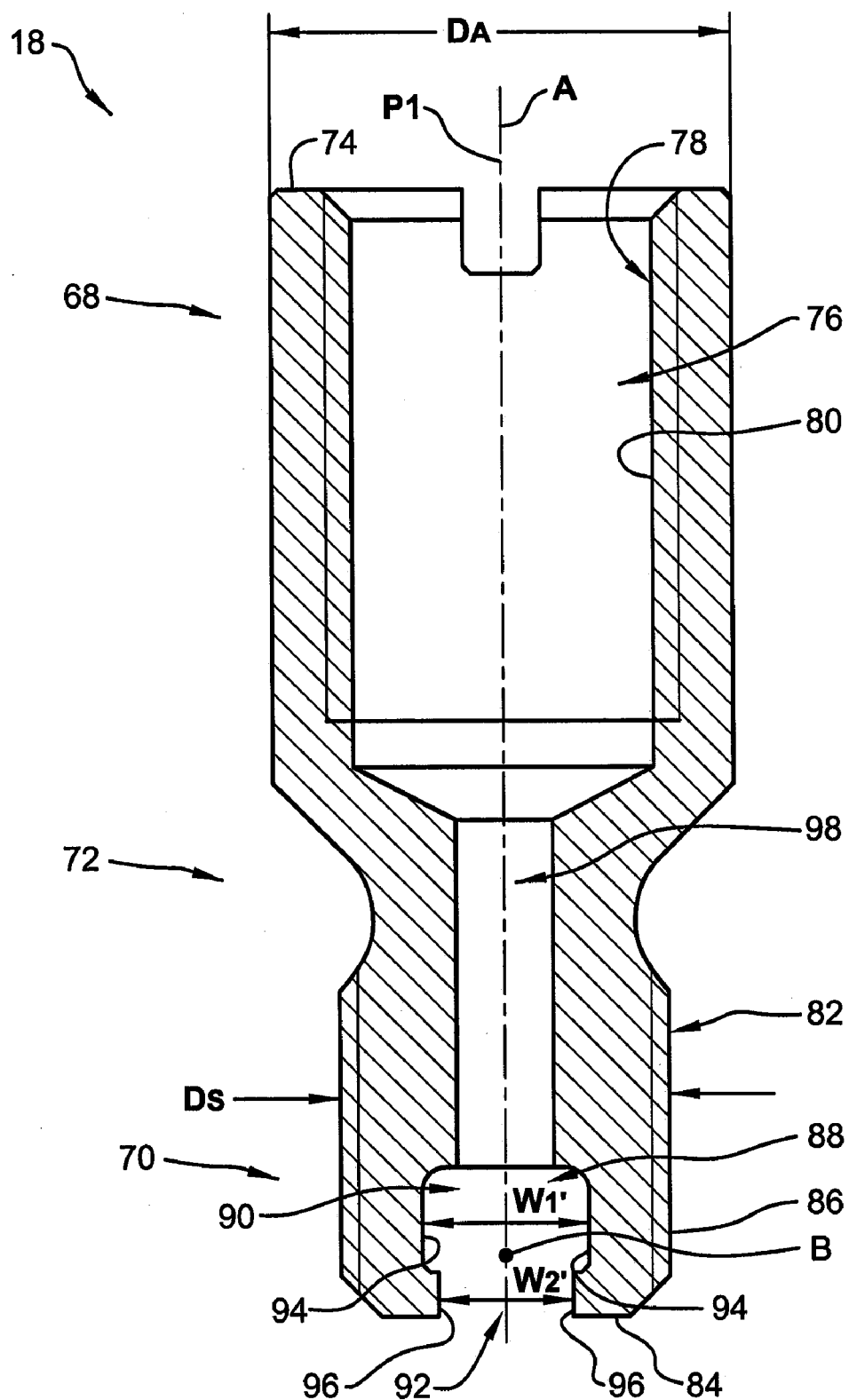
FIG. 6 is a cross sectional view of the adaptor taken in the plane VI-VI in FIG. 5.

Attention is now drawn to FIGS. 5 and 6. The adaptor 18 extends along the tool axis A and has a forward first section 68, a rear second section 70 and neck section 72 therebetween. The first section 68 has a forwardly facing first surface 74, an axially extending cylindrical body having an adaptor diameter $D_A$ and a first adaptor cavity 76 which is formed therein and extends along a second longitudinal axis which in the assembled tool is coincident with the tool axis A. The adaptor diameter $D_A$ is smaller than the middle diameter $D_M$ of the middle section 58 of the shank cavity 48. The first cavity 76 has a cylindrically shaped axially extending first wall 78 having an internal first thread 80 which is formed thereon.

The second section 70 of the adaptor 18 has a generally cylindrical peripheral second surface 82 which extends axially along the tool axis A to a rearwardly facing section face 84. The second surface 82 has a second diameter $D_S$ smaller than the adaptor diameter $D_A$ and an external second thread 86 which is formed thereon. A bore 88 having a bore axis B which is transverse to the tool axis A is formed in the second section 70. The adaptor 18 has mirror symmetry about a first plane P1 which includes the tool and the bore axes A, B. The bore 88 has a major portion 90 and a minor portion 92 extending along the bore axis B and opening out to opposing sides of the second surface 82. The minor portion 92 additionally opens out to the section face 84 and communicates with the major portion 90.

The major portion 90 of the bore 88 has two generally parallel major faces 94 on opposing sides of the first plane P1 and the minor portion 92 of the bore 88 has two generally parallel minor faces 96 on opposing sides of the first plane P1. The major faces 94 are spaced apart by a major width $W_1$ and the minor faces 96 are spaced apart by a minor width $W_2$ which is smaller than the major width $W_1$. An adaptor channel 98 having an axially extending cylindrical shape extends along the tool axis A and communicates with the first cavity 76 and with the major portion 90 of the bore 88. A key way 100 extending parallel to the bore axis B is formed on the first surface 74 of the first section 68 of the adaptor 18.

Figure 7:
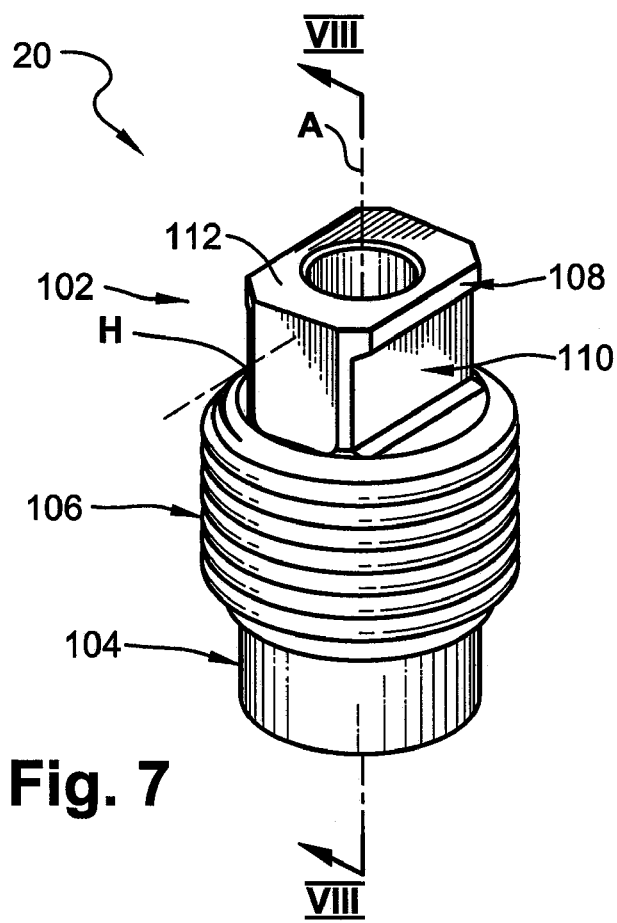
FIG. 7 is a perspective top view of a retaining element.
Figure 8:
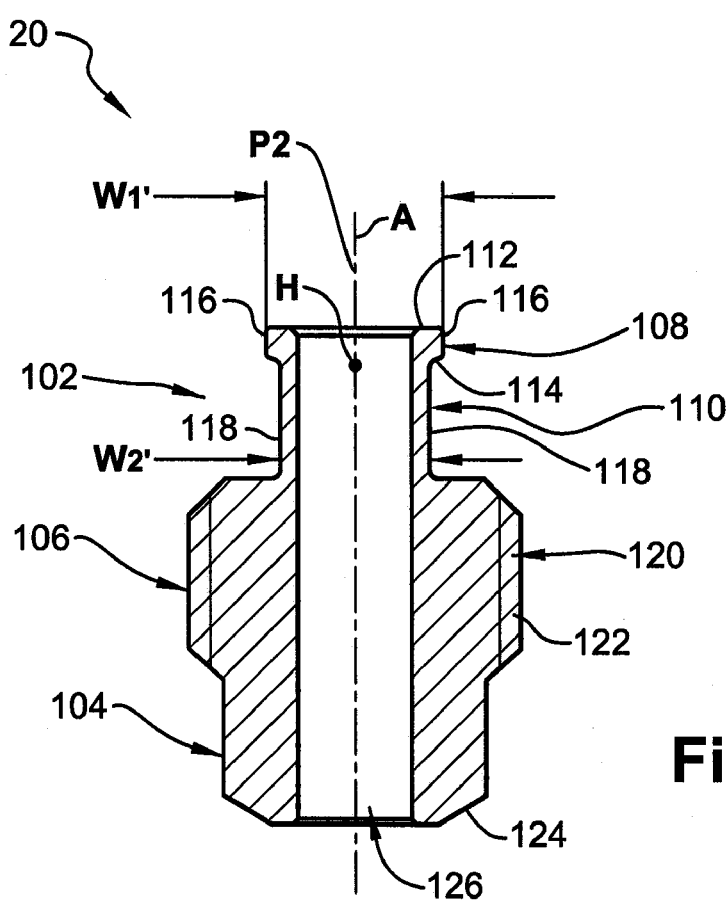
FIG. 8 is a cross sectional view of the retaining element taken in the plane VIII-VIII in FIG. 7.

Attention is now drawn to FIGS. 7 and 8. The retaining element 20 extends along a third longitudinal axis which in the assembled tool is coincident with the tool axis A and has a forward hook 102, a rear tube 104 and a bulge 106 therebetween. The hook 102 has a forward cap 108, a rear stem 110 and a hook axis H which perpendicularly intersects the tool axis A. The retaining element 20 has mirror symmetry about a second plane P2 which includes the tool and the hook axes A, H. The cap 108 has a forwardly facing cap surface 112, a rearwardly facing back face 114 and two cap side faces 116 which extend therebetween on opposing sides of the second plane P2. The stem 110 extends rearwardly from the back face 114 of the cap 108 and has two generally parallel stem side faces 118 which are located on opposing sides of the second plane P2. The cap 108 and the stem 110 extend along the hook axis H and the cap side faces 116 are spaced apart by a cap width $W_1$, and the stem side faces 118 are spaced apart by a stem width $W_2$, which is smaller than the cap width $W_1$. In addition, the cap width $W_1$, is smaller than the major width $W_1$ of the bore 88 and the stem width $W_2$, is smaller than the minor width $W_2$ of the bore 88 so that the hook 102 may slide into the bore 88 of the adaptor 18 (as will be described herein below).

The bulge 106 has a generally axially extending cylindrical shape having peripheral bulge surface 120. An external bulge thread 122 is formed on the bulge surface 120. The tube 104 has an axially extending cylindrical shape and a rearwardly facing tube face 124 at a rear end thereof. A cylindrical shaped retaining channel 126 which is formed in the retaining element 20 along the tool axis A opens out to the cap surface 112 and to the tube face 124.

Figure 9:
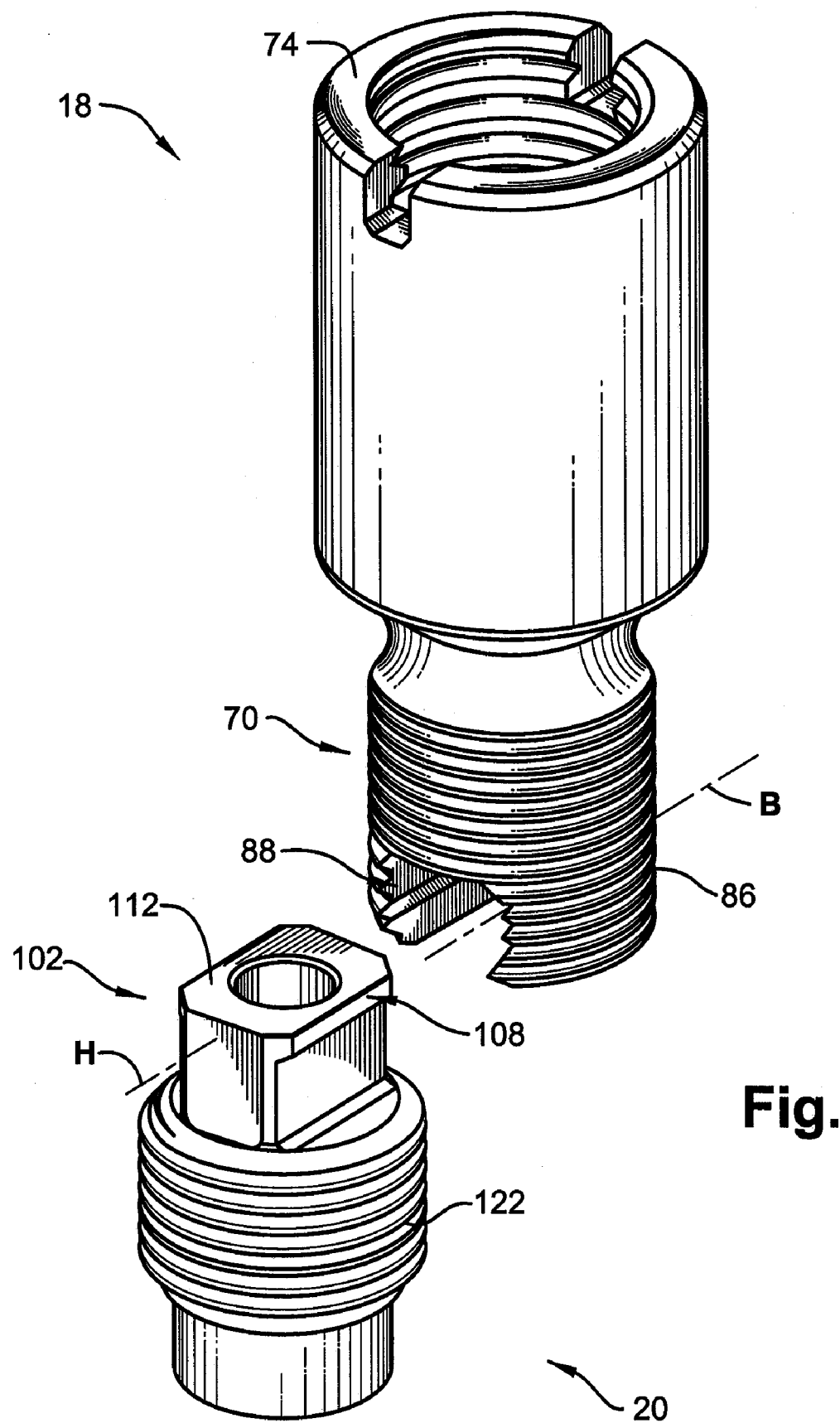
FIG. 9 is a perspective top view of the adaptor and retaining element.
Figure 10:
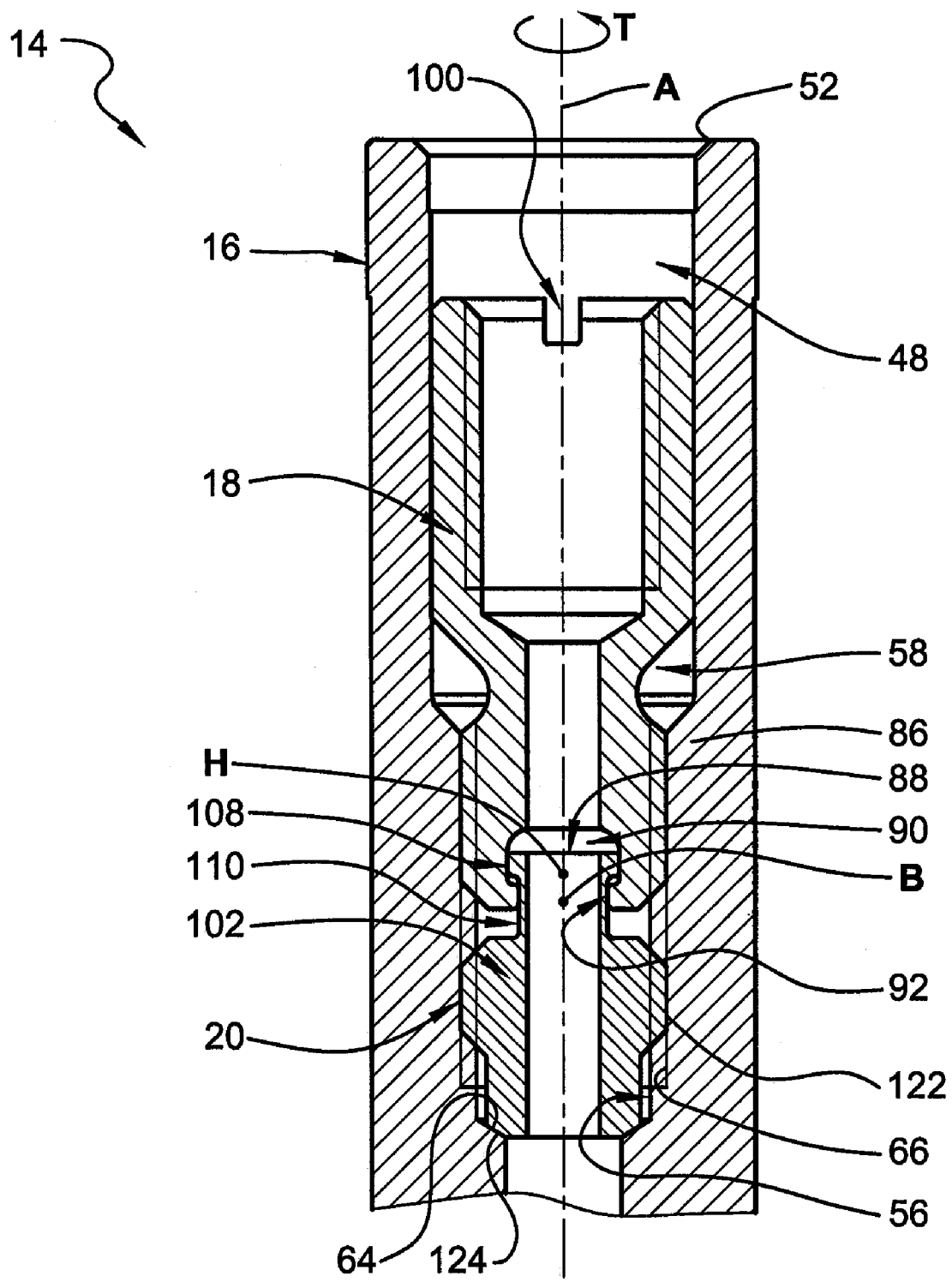
FIG. 10 is a longitudinal cross sectional view of a tool holder, taken in the plane of FIG. 1.

Attention is now drawn to FIGS. 9 and 10 to show how an assembled state the tool holder 14 may be reached. At first, a sub-assembly of the adaptor 18 and the retaining element 20 is performed. The retaining element 20 and the adaptor 18 are manually positioned so that the cap surface 112 and the first surface 74 generally face the same direction, the hook and the bore axes H, B are generally parallel and in a view along the hook axis H the cap 108 of the hook 102 overlies the major portion 90 of the bore 88. From this position the sub-assembly is reached by manually urging the retaining element 20 along the hook axis H until the cap 108 of the retaining element 20 is located in the major portion 90 of the bore 88 of the adaptor 18.

The sub-assembly is then placed, with the retaining element 20 leading, through the aperture 52 into the shank cavity 48 until the external bulge thread 122 of the retaining element 20 meets the retaining thread 66 of the shank cavity 48. The adaptor 18 and consequently the retaining element 20 are then rotated in a direction counter to the tangential direction T by a key (not shown) which matches the key ways 100 of the adaptor 18. As a result, the external bulge thread 122 of the retaining element 20, followed by the external second thread 86 of the adaptor 18, screw into the retaining thread 66 until the tube face 124 of the retaining element 20 abuts the stop wall 64 of the shank cavity 48 and the assembled state of the tool holder 14 is reached. As a consequence, both the adaptor 18 and the retaining element 20 are threadingly engaged to a single continuous retaining thread 66 formed on the wall of the shank cavity 48. And in one embodiment, the external second thread 86 formed on the adaptor 18 has the same pitch and diameter as the external bulge thread 112 formed on the retaining element 20

Figure 11:
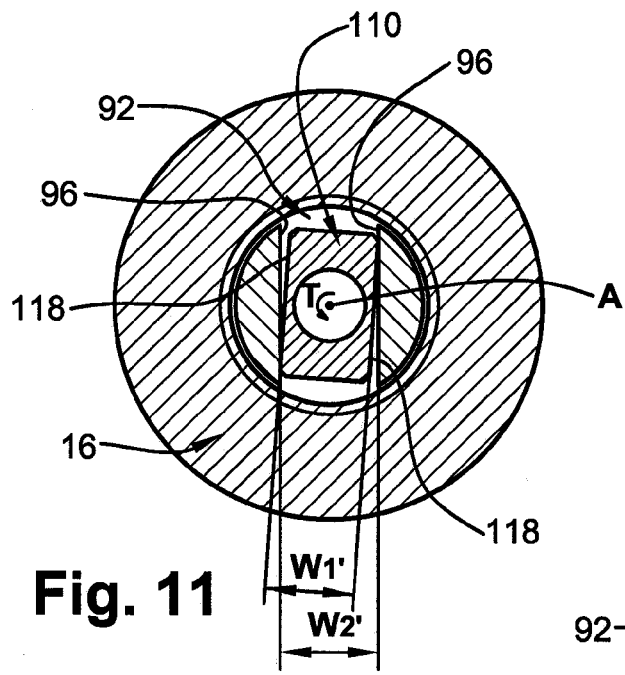
FIG. 11 is a cross sectional view of the reamer taken along the line M-M in FIG. 2 showing a positive position of the adaptor in relation to the retaining element.
Figure 12:
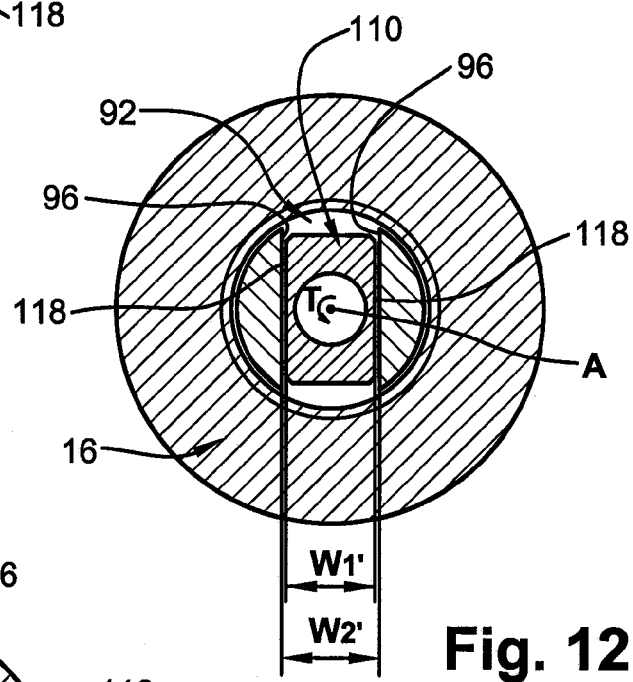
FIG. 12 is a cross sectional view of the reamer taken along the line M-M in FIG. 2 showing a neutral position of the adaptor in relation to the retaining element.
Figure 13:
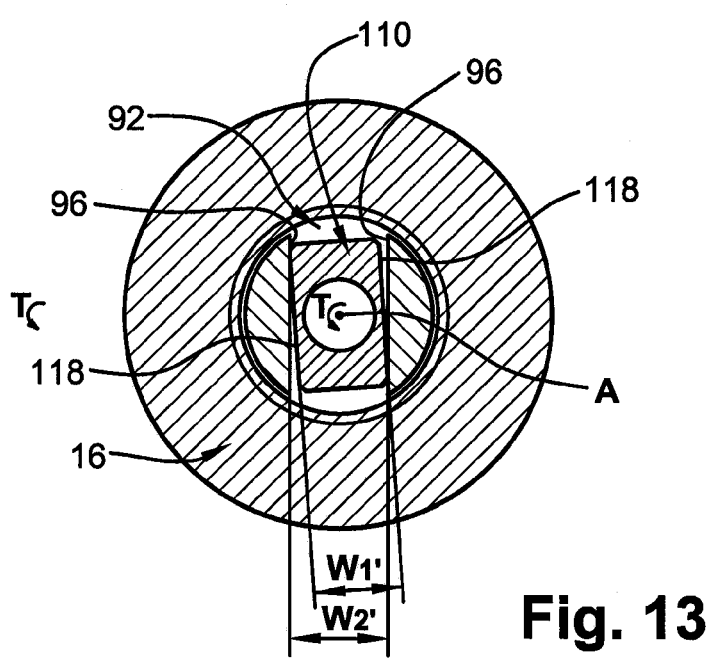
FIG. 13 is a cross sectional view of the reamer taken along the line M-M in FIG. 2 showing a negative position of the adaptor in relation to the retaining element.

Attention is now drawn to FIGS. 11 to 13. In the reamer 10 which is described herein the hook 102 of the retaining element 20 is tangentially located between portions of the bore 88 of the adaptor 18, or in other words the hook 102 extends along the hook axis H in a direction transverse to the tool axis A between portions of the bore 88 of the adaptor 18. In addition, the difference between the minor width $W_2$ of the bore 88 and the stem width $W_2$, of hook 102 is smaller than the difference between the major width $W_1$ of the bore 88 and the cap width $W_1$, of the hook 102 so that rotation of the adaptor 18 about the tool axis A may lead to tangential abutment between the stem side faces 118 of the hook 102 and the minor faces 96 of the bore 88. However, it will be understood that the tangential abutment may alternatively occur between the cap side faces 116 of the hook 102 and the major faces 94 of the bore 88 if so designed.

It can thus be seen that, by virtue of the hook 102 and the bore 88, a forward portion of the retaining element 20 and a rear portion of the adaptor 18 overlap in a direction transverse to the longitudinal tool axis A without being threadingly engaged to one another. Thus, the forward portion of the retaining element 20 is positioned and configured to limit rotation of the adaptor 18 about the longitudinal tool axis A. Furthermore, in one embodiment, the hook 102 and the bore 88 are shaped so as to prevent full separation of the retaining element 20 from the adaptor 18 along a solely axial direction of the sub-assembly.

In the reamer 10 the adaptor 18 may have a positive position, a neutral position or a negative position in relation to the retaining element 20. In the positive position, portions of the minor faces 96 of the bore 88 facing the tangential direction T abut portions of the stem side faces 118 of the hook 102 facing the direction counter to the tangential direction T (FIG. 11). In the neutral position, the minor faces 96 of the bore 88 do not abut the stem side faces 118 of the hook 102 (FIG. 12). In the negative position, portions of the minor faces 96 of the bore 88 facing the direction counter to the tangential direction T abut portions of the stem side faces 118 of the hook 102 facing the tangential direction T (FIG. 13).

The retaining element 20 is therefore used, inter alia, to limit the movement of the adaptor 18 in the tangential direction T between the positive and the negative positions which means that the adaptor 18 will generally remain in a fixed position in the retaining thread 66 when subjected to screwing forces in the direction counter to the tangential direction T or unscrewing forces in the tangential direction T. It is noted that other objects, which may be fixed in the shank cavity 48 and tangentially located between portions of the adaptor 18, may also be used to limit the movement of the adaptor 18 along the tangential direction T. A pin (not shown) which passes through the shank 16 and the bore 88 in a transverse direction to the tool axis A is an example of such an object. If such an object is used in the reamer 10, the retaining element 20 may not be required any more and the bore 88 of the adaptor 18 may have a shape which does not open out to the section face 84.

Attention is now additionally drawn back to FIG. 2. If between the negative and the positive positions, the adaptor 18 and the retaining element 20 do not axially abut then the adaptor 18 is defined as being in a floating state. In the floating state, axial support of the adaptor 18 in the shank cavity 48 is only affected by the external second thread 86 which, as known in the art, is freely fitted in the retaining thread 66. This freedom may allow the adaptor 18, in the floating state, to slightly adjust its orientation when axially retaining objects in the shank cavity 48. In addition it is noted that the threading retention of the adaptor 18 in the shank cavity 48 provides a firm grip for the adaptor 18 against forces acting thereupon along the tool axis A.

An assembled position of the reamer 10, in which the cutting head 12 is in a secured position in the tool holder 14 will now be described. To reach the assembled position, the cutting head 12 is first placed with the threaded portion 38 leading through the aperture 52 into the shank cavity 48 until the circular face 42 of the cutting head 12 meets the internal first thread 80 of the adaptor 18. From this position the cutting head 12 is rotated in the direction counter to the tangential direction T causing the external thread of threaded portion 38 of the cutting head 12 to screw into the internal first thread 80 of the adaptor 18 until the cutting head 12 reaches the secured position. In the secured position, the head support wall 40 and the head annular face 28 axially align the cutting head 12 in the tool holder 14 by respectively abutting the shank support wall 60 and the shank annular face 46. It is noted the adaptor 18 may have a small effect, if any, on the axial alignment of the cutting head 12 in the tool holder 14 when the adaptor 18 is in the floating state.

Through the assembled rear 10 a continuous passage is formed along the tool axis by the shank channel 50, the retaining channel 126, the major portion 90 of the bore 88, the adaptor channel 98, the first cavity 76 and the head channel 44. Through this passage coolant fluid may be supplied to the cutting head 12.

The present invention potentially provides a combination of advantages. First, the threading engagement of the adaptor in the shank cavity firmly secures the adaptor and consequently the cutting head in the cutting tool. Second, the retaining element prevents the adaptor from being screwed out of the tool holder when the cutting head is being replaced. Finally, the adaptor has limited effect, if any, on the alignment of the cutting head when not engaging the retaining element.

Although the present invention has been described to a certain degree of particularity, it should be understood that various alterations and modifications could be made without departing from the scope of the invention as hereinafter claimed.

What is claimed is:

1. A tool holder having a longitudinal axis A, and comprising:
    a shank having a shank cavity that extends along the longitudinal axis A, the shank cavity comprising a retaining wall provided with at least one retaining thread;
    an adaptor extending along the longitudinal axis A and having an external thread engaged to said at least one retaining thread; and
    a retaining element extending along the longitudinal axis A and being fixed in the shank cavity, wherein:
    a forward portion of the retaining element and a rear portion of the adaptor overlap in a direction transverse to the longitudinal tool axis A without being threadingly engaged to one another.

2. The tool holder according to claim 1, wherein the forward portion of the retaining element is positioned and configured to limit rotation of the adaptor about the longitudinal tool axis A.

3. The tool holder according to claim 1, wherein the retaining element is threadingly engaged in the shank cavity.

4. The tool holder according to claim 1, wherein a peripheral surface of the retaining element is provided with an external thread which is threadingly engaged to said at least one retaining thread.

5. The tool holder according to claim 1, wherein the adaptor and the retaining element are both threadingly engaged to a single continuous retaining thread formed on the retaining wall of the shank cavity.

6. The tool holder according to claim 1, wherein:
    the rear portion of the adaptor is provided with a bore having a bore axis that is transverse to the longitudinal axis;
    the forward portion of the retaining element is provided with a hook;
    the hook is positioned in the bore; and
    the hook and bore are shaped so as to prevent full separation of the retaining element from the adaptor along a solely axial direction.

7. The tool holder according to claim 1, wherein:
    the forward portion of the retaining element is located between portions of the adaptor.

8. A cutting tool having a longitudinal tool axis A defining a forward to rear direction, the cutting tool comprising:
    a tool holder comprising:
        a shank having a shank cavity that extends along the longitudinal axis A, the shank cavity comprising a retaining wall provided with at least one retaining thread;
        an adaptor extending along the longitudinal axis A and having an external thread engaged to said at least one retaining thread; and
        a retaining element extending along the longitudinal axis A and being fixed in the shank cavity, wherein:
        a forward portion of the retaining element and a rear portion of the adaptor overlap in a direction transverse to the longitudinal tool axis A without being threadingly engaged to one another; and
    a cutting head removably secured to the adaptor.

9. The cutting tool according to claim 8, wherein:
    the adaptor further has a first thread;
    the cutting head comprises a cutting portion and a fastening portion, the fastening portion having a threaded portion; and
    the threaded portion of the cutting head is threadingly engaged to the first thread of the adaptor, thereby removably securing the cutting head to the adaptor.

10. The cutting tool according to claim 9, wherein:
    the first thread of the adaptor is an internal thread; and
    the threaded portion of the cutting head comprises an external thread.

11. The cutting tool according to claim 9, wherein:
    the fastening portion of the cutting head is integrally formed with the cutting portion to have unitary one-piece construction.

12. The cutting tool according to claim 8, wherein the forward portion of the retaining element is positioned and configured to limit rotation of the adaptor about the longitudinal tool axis A.

13. The cutting tool according to claim 8, wherein the retaining element is threadingly engaged in the shank cavity.

14. The cutting tool according to claim 8, wherein a peripheral surface of the retaining element is provided with an external thread which is threadingly engaged to said at least one retaining thread.

15. The cutting tool according to claim 14, wherein the adaptor and the retaining element are both threadingly engaged to a single continuous retaining thread formed on the retaining wall of the shank cavity.

16. The cutting tool according to claim 8, wherein:
the rear portion of the adaptor is provided with a bore having a bore axis that is transverse to the longitudinal axis;
the forward portion of the retaining element is provided with a hook;
the hook is positioned in the bore; and
the hook and bore are shaped so as to prevent full separation of the retaining element from the adaptor along a solely axial direction.

17. The cutting tool according to claim 8, wherein:
the forward portion of the retaining element is located between portions of the adaptor.

18. A cutting tool having a longitudinal tool axis A, the cutting tool comprising:
a tool holder comprising a shank, an adaptor and a retaining element all arranged along the tool longitudinal axis A; wherein:
the shank comprises an axially extending shank cavity;
the adaptor is threadingly engaged in the shank cavity; and
a forward portion of the retaining element and a rear portion of the adaptor overlap in a direction transverse to the longitudinal tool axis A without being threadingly engaged to one another, said forward portion of the retaining element being positioned and configured to limit rotation of the adaptor about the longitudinal tool axis A; and
a cutting head retained by the adaptor.

19. The cutting tool according to claim 18, wherein axial support of the adaptor within the shank cavity is provided solely by threaded engagement of an external thread formed on the adaptor with a retaining thread formed in the shank cavity.

20. A method of assembling a cutting tool comprising:
providing a cutting head;
providing a shank having a shank cavity extending along a first longitudinal axis and defining a forward end and a rear end;
providing an adaptor having an adaptor cavity extending along a second longitudinal axis, the adaptor having a bore formed at a rear end thereof, the bore generally extending along a bore axis which is transverse to said second longitudinal axis;
providing a retaining element having a third longitudinal axis, the retaining element having a forward end provided with a hook, the hook generally extending along a hook axis which is transverse to said third longitudinal axis;
aligning the hook axis of the retaining element with the bore axis of the adaptor;
urging at least one of the retaining element and the adaptor towards the other until at least a portion of the hook is located in the bore and the retaining element and the adaptor form a sub-assembly;
inserting the sub-assembly into the shank cavity such that the adaptor and the retaining element both threadingly engage the shank cavity; and
threadingly engaging the cutting head to the adaptor.

\* \* \* \* \*